US 8,813,198 B2

(12) United States Patent
Louboutin et al.

(10) Patent No.: US 8,813,198 B2
(45) Date of Patent: Aug. 19, 2014

(54) CONFIGURATION OF ACCESSORIES FOR WIRELESS NETWORK ACCESS

(75) Inventors: Sylvain R. Y. Louboutin, Sunnyvale, CA (US); Gregg Golembeski, Jr., San Francisco, CA (US); Allen Denison, San Jose, CA (US)

(73) Assignee: Apple Inc., Cupertino, CA (US)

( * ) Notice: Subject to any disclaimer, the term of this patent is extended or adjusted under 35 U.S.C. 154(b) by 35 days.

(21) Appl. No.: 13/176,340

(22) Filed: Jul. 5, 2011

(65) Prior Publication Data
US 2013/0014232 A1   Jan. 10, 2013

(51) Int. Cl.
*G06F 7/04*   (2006.01)

(52) U.S. Cl.
USPC ............................. 726/5; 380/270; 713/171

(58) Field of Classification Search
USPC ........ 726/5; 713/168, 171; 380/270; 709/227
See application file for complete search history.

(56) References Cited

U.S. PATENT DOCUMENTS

| 2006/0293028 | A1* | 12/2006 | Gadamsetty et al. ......... 455/411 |
| 2008/0175187 | A1  |  7/2008 | Lowry et al. |
| 2009/0327560 | A1  | 12/2009 | Yalovsky |
| 2011/0106954 | A1* |  5/2011 | Chatterjee et al. ............ 709/227 |
| 2011/0238995 | A1* |  9/2011 | Blanco et al. ................. 713/173 |
| 2012/0054493 | A1* |  3/2012 | Bradley ........................ 713/171 |

FOREIGN PATENT DOCUMENTS

WO   2012/030733   3/2012

OTHER PUBLICATIONS

International Search Report and Written Opinion in Application No. PCT/US2012/044254, issued Oct. 11, 2012, pp. 1-13.

* cited by examiner

*Primary Examiner* — Samson Lemma
(74) *Attorney, Agent, or Firm* — Meyertons, Hood, Kivlin, Kowert & Goetzel, P.C.

(57) ABSTRACT

A portable computing device can enable an accessory to access a wireless network. In particular, the portable computing device can provide a wireless network access credential to the accessory. The accessory can thereafter use the wireless network access credential to access a wireless network. The portable computing device can additionally configure an access point that manages the wireless network to permit the accessory to join the wireless network.

20 Claims, 9 Drawing Sheets

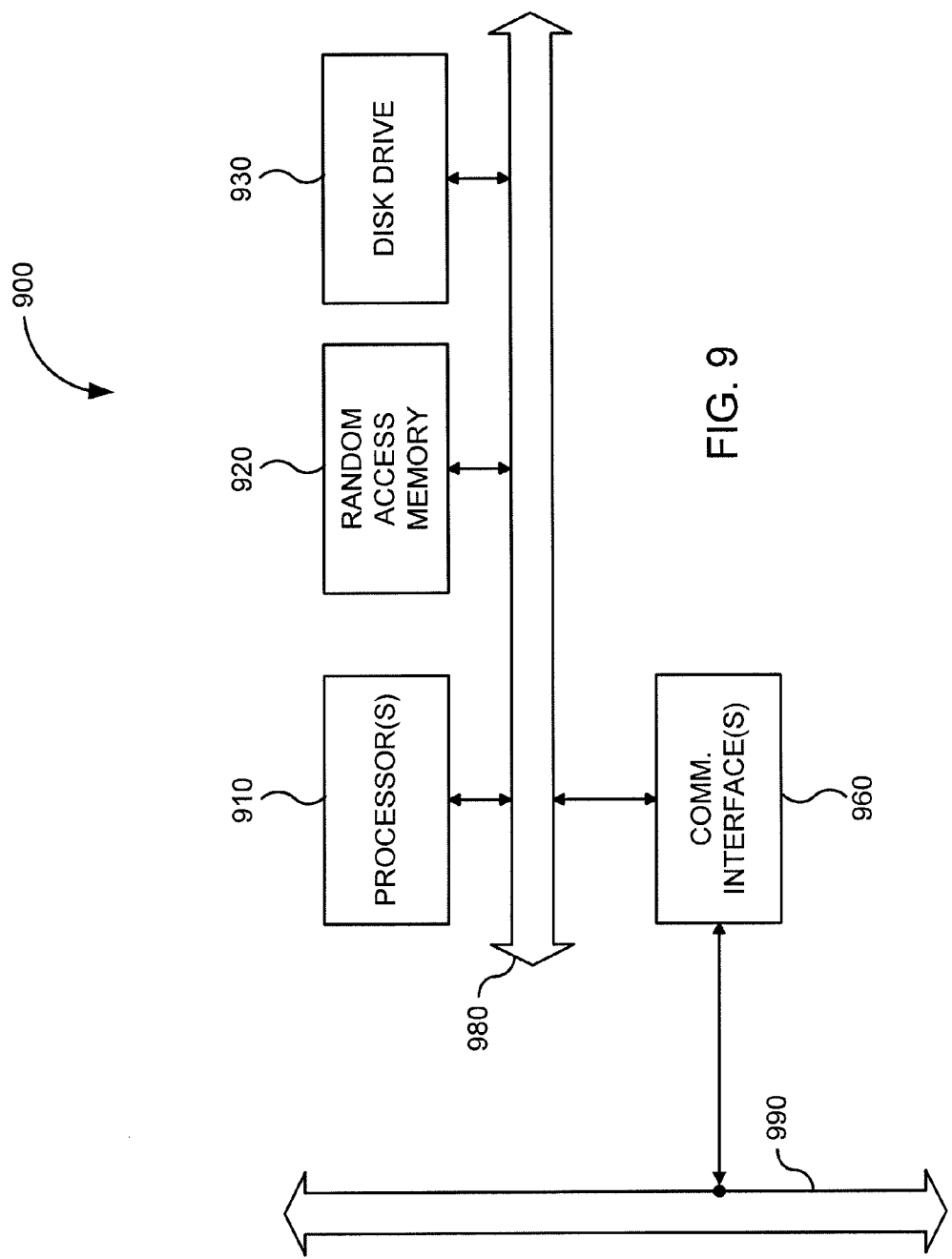

CONFIGURATION OF ACCESSORIES FOR WIRELESS NETWORK ACCESS

BACKGROUND

The present disclosure relates generally to wireless communication between computing devices and more particularly to configuring an accessory for operation with a wireless network.

Computing devices have been in use for several decades. Examples of computing devices include, for example, desktop computers, laptop computers, mobile phones, smartphones, tablet devices, portable multimedia players, devices integrated into automobiles, and/or the like. Computing devices can be used for performing a wide variety of tasks, from the simple to the most complex. In some embodiments, computing devices can have weight and size characteristics, such that the device is portable or easily moved.

In some instances, computing devices can communicate wirelessly over wireless networks. For example, computing devices can communicate over wireless networks based on the Institute of Electrical and Electronics Engineers (IEEE) 802.11 family of standards, also referred to as "WiFi". These standards (including 802.11a, 802.11b, 802.11g and 802.11n) define frequency, modulation, data rates, and message formats for communicating information between devices. In general, in an 802.11-compliant wireless network (also referred to as a "WiFi network"), there is a designated "access point," often with a wired connection to the Internet, that manages the WiFi network. Among other operations, the access point can route messages between networked client devices. The WiFi network often has a name (generally configurable by a network administrator interacting with the access point), which the access point can periodically broadcast, and client devices that know the name or discover the network name from the access point's broadcast can join the network by sending requests to join to the access point. In some cases, the requests can additionally include a password or access key. Computing devices can communicate wirelessly over other communication standards as well. For example, computing devices can use Bluetooth, Bluetooth Low Energy (LE), Zigbee, etc.

In general configuring devices to wirelessly communicate with other devices can be a difficult process, as users often must manually enter in network access information, personal identification numbers, wait for scans to complete, interact with unintuitive setup programs, and/or the like.

SUMMARY

According to various embodiments of the present invention, a portable computing device can enable an accessory to access a wireless network. In particular, the portable computing device can provide a wireless network access credential to the accessory. The accessory can thereafter use the wireless network access credential to access a wireless network.

Illustratively, a portable computing device can be connected to an accessory. For example, a portable computing device can be connected to an accessory via a docking mechanism. Upon establishing a connection, the portable computing device can transmit a network access credential to the accessory. The network access credential can include any suitable information for enabling the accessory to access a WiFi network. For example, in some embodiments, the wireless network access credential can include a service set identifier (SSID) for a WiFi network, an access key or password for the WiFi network, etc. The accessory can thereafter connect to the WiFi network using the received credential.

In some embodiments, a portable computing device can be configured to transmit a wireless network access credential only under certain conditions. For example, a portable computing device can be configured to provide a wireless network access credential only if the device is currently connected to that network. As another example, a portable computing device can be configured to provide a wireless network access credential only if the device is currently in an unlocked state. As yet another example, a portable computing device can be configured to provide a wireless network access credential only if a user provides express approval.

In certain embodiments, a portable computing device can enable an accessory to establish a point-to-point connection with another device using Bluetooth or some other short-range wireless protocol. Illustratively, the portable computing device can, subject to one or more conditions, transmit an access credential. The access credential can include pairing information, such as Bluetooth device addresses (BD_ADDR), clock information, etc. The accessory can thereafter connect with the Bluetooth device associated with the received access credential.

These and other embodiments of the invention along with many of its advantages and features are described in more detail in conjunction with the text below and attached figures.

BRIEF DESCRIPTION OF THE DRAWINGS

FIG. 9 is a block diagram of an electronic device which may implement embodiments described herein.

DETAILED DESCRIPTION

Figure 1:
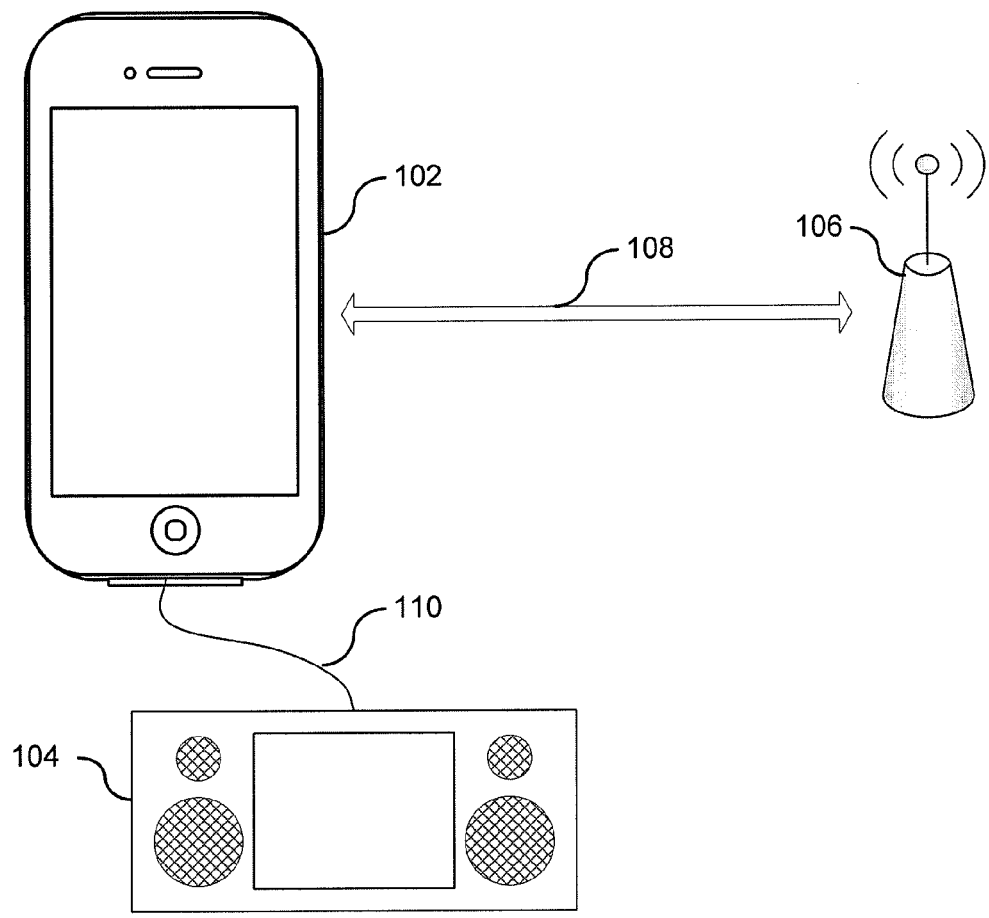
FIG. 1 illustrates a system including a portable computing device, an accessory, and an access point according to an embodiment of the present invention.

Certain embodiments of the present invention provide techniques for enabling an accessory to access a wireless network. In particular, a portable computing device can provide a wireless network access credential to a connected accessory. The accessory can thereafter use the wireless network access credential to join and access a wireless network. In some embodiments, a wireless network access credential can include a service set identifier (SSID) for a wireless network, an access key or password for the wireless network, etc.

By enabling a portable computing device to configure an accessory for wireless network access, embodiments enable a user to avoid having to enter network access information when the user desires an accessory to be configured to operate with a wireless network. Furthermore, embodiments enable a user to avoid being required to configure an accessory through using unintuitive and non-standardized connection procedures. Illustratively, many accessories may have very limited user interfaces or lack user interfaces altogether. For example, in order to configure an accessory for wireless network access, a user must often interact with a web-based setup program on a separate device (e.g., a laptop, a desktop computer etc.). In many instances, such web-based setup programs can be non-standardized (e.g., each program can have its own procedures, terms, etc.) and can be difficult to operate. Embodiments, by contrast, can enable a simple, intuitive and unified manner of configuring an accessory for wireless network access.

According to some embodiments, the portable computing device can be configured to provide a wireless network access credential only under certain conditions. For example, a portable computing device can be configured to provide a wireless network access credential only if the device is currently connected to the network. As another example, a portable computing device can be configured to provide a wireless network access credential only if the device is currently in an unlocked state. As yet another example, a portable computing device can be configured to provide a wireless network access credential only if the portable computing device receives an expressed, affirmative response from a user.

Placing such conditions on when a portable device can transmit an access credential can help to maintain the security of a wireless network. For example, many portable computing devices are configured to automatically enter a locked state after a short period of time (e.g., 1 to 5 minutes). When the device is in a locked state, a user cannot access many of the features of the portable computing device. In order to cause the portable computing device to enter into an unlocked state, a user may be required to supply a personal identification number (PIN) or passcode to the device. Thus, by requiring a portable computing device to be in an unlocked state before allowing transmission of a wireless network access credential, it can be made more likely that transmission of the credential is approved by an authorized user. As a result, the security of the wireless network can be maintained.

It should be appreciated that while the embodiments described herein are directed primarily to 30-pin connectors, any suitable connectors can be used to e.g., establish connections between portable computing devices and accessories. For example, connectors that enable USB connections, other serial connections, PDMI connections, etc. can be used.

FIG. 1 illustrates a system 100 including a portable computing device 102, an accessory 104, and an access point 106. Portable computing device 102, accessory 104 (e.g., stereo speakers), and access point 106 each can include a wireless communication interface, such as a standard WiFi card, and various other components, examples of which are described in detail below.

Portable computing device 102 can be any portable computing device with a wireless interface, such as a laptop computer, a tablet device, a multi-function device, a mobile phone, a portable gaming device, a portable multimedia player, a portable music player, a portable digital stream receiver, a storage device, a camera, a remote control, a personal access point, a personal digital assistant (PDA), a household appliance or device, and/or any portable or non-portable electro-mechanical device and/or the like. For example, portable computing device 200 can be an iPod®, iPhone®, or iPad® device available from Apple Inc. of Cupertino, Calif.

Accessory 104 can be any device capable of connecting to a portable computing device, such as a laptop computer, a tablet device, a printer, a speaker system, a docking station, a display (e.g., LCD, CRT monitor, projector), a microphone, a keyboard, a computer mouse, a multimedia streaming device, a camera, a remote control, a headphone set, a gaming device, a global positioning device, a multi-function device, a mobile phone, a digital video recorder (DVR), a backup device, a storage device, a portable gaming device, a portable multimedia player, a portable music player, a portable digital stream receiver, a personal digital assistant (PDA), a household appliance or device, and/or any portable or non-portable electro-mechanical device and/or the like. For example, accessory 104 can be a speaker system capable of wirelessly streaming audio to or receiving audio from other devices.

Access point 106 can be any suitable device for managing a wireless network, and facilitating communication between networked client devices, external networks, etc. Illustratively, access point 106 can, among other operations, route messages between networked client devices, and/or enable the client devices to access an external network, such as the Internet. In some embodiments, access point 106 can facilitate communications based on the IEEE 802.11 family of standards. Access point 106 can be, for example, a router or other portable or non-portable device, such as an AirPort Express™ device available from Apple Inc. of Cupertino, Calif.

As shown in FIG. 1, portable computing device 102 and accessory 104 can be in operative communication over connection 110. Connection 110 can be any suitable physical connection. For example, portable computing device 102 and accessory 104 can be connected via a cable. As another example, portable computing device 102 and accessory 104 can be connected via a docking interface. In some embodiments, accessory 104 can request a wireless network access credential from portable computing device 102 over connection 110. In response, portable computing device 102 can transmit the requested wireless network access credential to accessory 104. Accessory 104 can thereafter use the wireless network access credential to join and/or access a WiFi network managed by access point 106.

Portable computing device 102 and access point 106 can be in operative communication over a connection 108. For example, portable computing device 102 and access point 106 can communicate over a WiFi connection. The WiFi connection can be, in certain embodiments, secured using a suitable security protocol, such as the wired equivalent privacy (WEP) or WiFi protected access (WPA) protocols. In certain embodiments, portable computing device 102 can indicate to access point 106 that accessory 104 be permitted to access a WiFi network managed by the access point. In some embodiments, portable computing device 102 can additionally transmit a device identifier (e.g., a media access control (MAC) address) for accessory 104 to access point 106.

Figure 2:
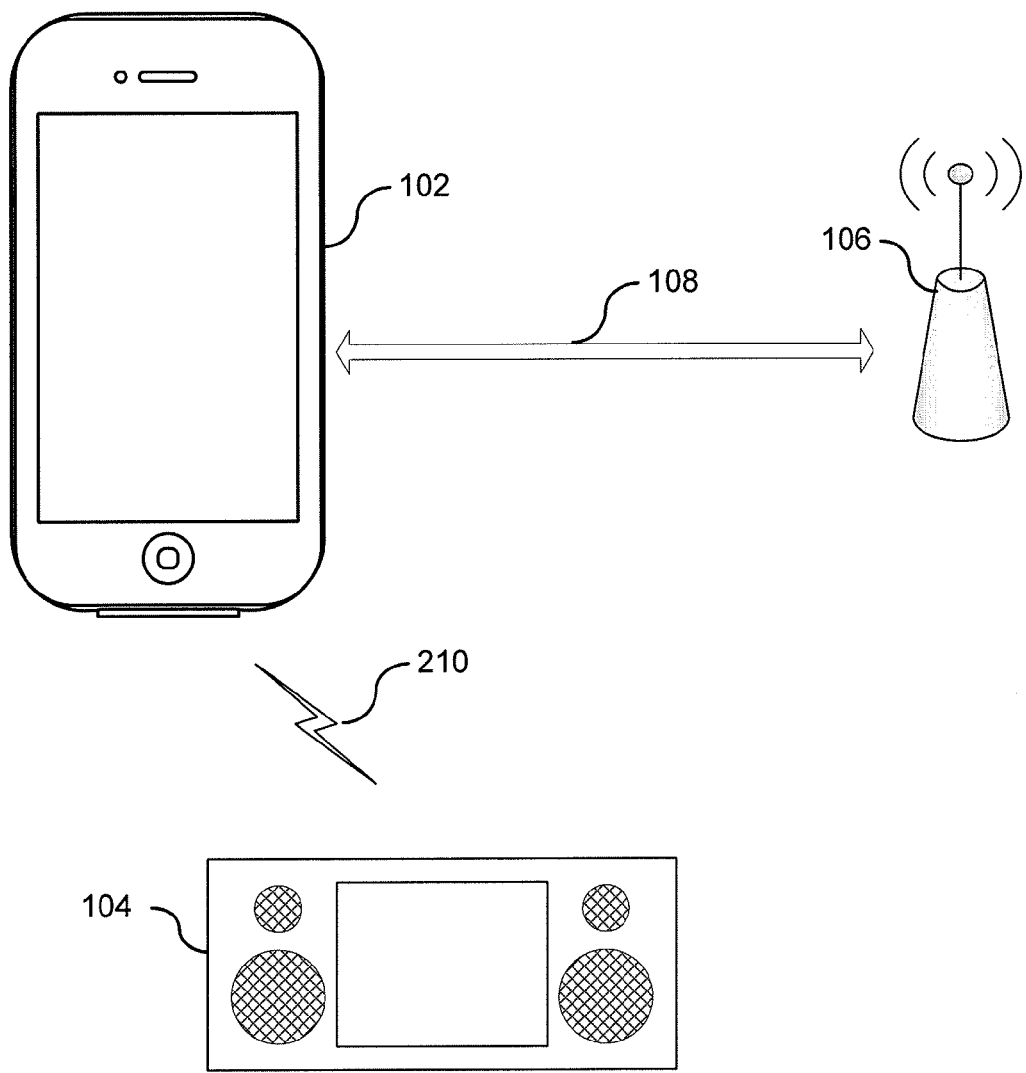
FIG. 2 illustrates a system including a portable computing device, an accessory, and an access point according to another embodiment of the present invention.

FIG. 2 illustrates a system 200 including a portable computing device 102, an accessory 104, and an access point 106. System 200 is similar to system 100 shown in FIG. 1, except that portable computing device 102 and accessory 104 can communicate over a wireless connection 210. For example, portable computing device 102 and accessory 104 can communicate over a Bluetooth or Bluetooth LE connection.

It will be appreciated that the devices shown in FIGS. 1 and 2 are illustrative and that variations and modifications are possible. For instance, although the system of FIGS. 1 and 2 each only shows one portable computing device, one accessory, and one access point, any suitable number of these entities (including zero) can be included. For example, systems 100 and 200 can each include two accessories that are connected to portable computing device 102.

Figure 3:
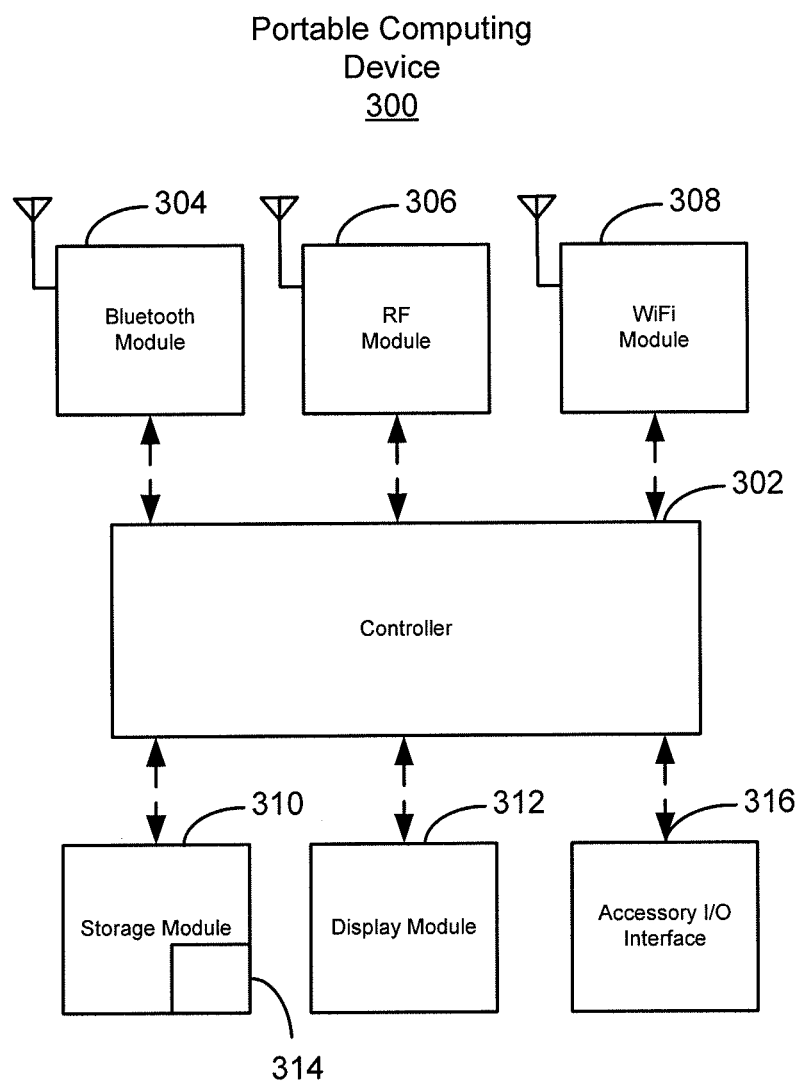
FIG. 3 illustrates an exemplary portable computing device according to an embodiment of the present invention.

FIG. 3 is a block diagram showing an exemplary portable computing device 300 (e.g., portable computing device 102) according to an embodiment. In one example, portable computing device 300 can include a controller 302, a Bluetooth module 304, an RF module 306, a WiFi module 308, a storage module 310, a display module 312, and an accessory input/output module 316. In some embodiments, portable computing device 300 can include additional modules, such as global positioning system (GPS) modules, battery modules, motion detection modules, device orientation modules, audio modules, three-dimensional video processing modules, magnometer modules, three-dimensional gyroscope modules, acceleration detection modules, and/or the like. In some embodiments, portable computing device 300 can be a sufficient size, dimension, and weight to enable the device to be easily moved by a user. For example, portable computing device 300 can be pocket size.

In certain embodiments, one or more components (e.g., controller 302, Bluetooth module 304, etc.) of portable computing device 300 can be enclosed within a device housing. The device housing can be implemented using any suitable materials, such as plastic, metal, acrylic, glass, wood, etc.

Controller 302, which can be implemented as one or more integrated circuits, can control and manage the overall operation of portable computing device 300. For example, controller 302 can perform various tasks, such as retrieving various assets that can be stored in storage module 310, accessing the functionalities of various modules (e.g., interacting with other Bluetooth enabled devices via Bluetooth module 304), executing various software programs (e.g., operating systems and applications) residing on storage module 310, transmitting wireless network access credentials, transmitting device identifiers, and so on. In some embodiments, controller 302 can include one or more processors (e.g., microprocessors or microcontrollers) configured to execute machine-readable instructions. For example, controller 302 can include a single chip applications processor. Controller 302 can further be connected to storage module 310 in any suitable manner.

Bluetooth module 304 can include any suitable combinations of hardware for performing wireless communications with other Bluetooth enabled devices and allows an RF signal to be exchanged between controller 302 and other Bluetooth enabled devices. In some embodiments, Bluetooth module 304 can perform such wireless communications according to standard Bluetooth Basic Rate/Enhanced Data Rate (BR/EDR) and/or Bluetooth Low Energy (LE) standards. For example, Bluetooth module 304 can include suitable hardware for performing device discovery, connection establishment, and communication based on only Bluetooth LE (e.g., single mode operation). As another example, Bluetooth module 304 can include suitable hardware for device discovery, connection establishment, and communication based on both standard Bluetooth BR/EDR and Bluetooth LE (e.g., dual mode operation). As still another example, Bluetooth module 304 can include suitable hardware for device discovery, connection establishment, and communication based only on standard Bluetooth BR/EDR.

RF module 306 can include any suitable combinations of hardware for performing wireless communications with wireless voice and/or data networks. For example, RF module 306 can include a RF transceiver (e.g., using mobile telephone technology such as GSM or CDMA, advanced data network technology such as 3G or EDGE) that enables a user of portable computing device 300 to place telephone calls over a wireless voice network.

WiFi module 308 can include any suitable combinations of hardware for performing WiFi (e.g., IEEE 802.11 family standards) based communications with other WiFi enabled devices.

Storage module 310 can be implemented, e.g., using disk, flash memory, random access memory (RAM), hybrid types of memory, optical disc drives or any other storage medium that can store program code and/or data. Storage module 310 can store software programs 314 that are executable by controller 302, including operating systems, applications, and related program code. In some embodiments, storage module 310 can include a suitable set of instructions, executable by controller 302, for transmitting wireless network access credentials to connected accessories and device identifiers to connected access points.

Software programs 314 (also referred to as software or apps herein) can include any program executable by controller 302. In some embodiments, certain software programs can be installed on portable computing device 300 by its manufacturer, while other software programs can be installed by a user. Examples of software programs 314 can include operating systems, productivity applications, video game applications, personal information management applications, applications for playing media assets and/or navigating a media asset database, applications for controlling a telephone interface to place and/or receive calls, applications for configuring an accessory for wireless network access, and so on. Certain software programs 314 can provide communication with and/or control of portable computing devices, and certain software programs 314 can be responsive to control signals or other input from portable computing device 300.

Display module 312 can be implemented as a CRT display, an LCD display (e.g., touch screen), a plasma display, a direct-projection or rear-projection DLP, a microdisplay, and/or the like. In various embodiments, display module 312 can be used to visually display user interfaces, images, and/or the like. In some embodiments, display module 312 can also be configured to receive input from a user of portable computing device 300. For example, display module 312 can be an LCD-based touch screen. During operation, display module 312 can present graphical user interfaces to a user and also receive inputs (e.g., finger taps) from the user. In other embodiments, additional user interface components (physical buttons, switches, keyboard, etc.) can be provided.

Accessory input/output (I/O) interface 316 can include a number of signal paths configured to carry various signals between portable computing device 300 and an accessory. In one embodiment, accessory I/O interface 316 can include a 30 pin connector corresponding to the connector used on iPod® and iPhone® products manufactured and sold by Apple Inc.; other connectors can also be used.

Figure 4:
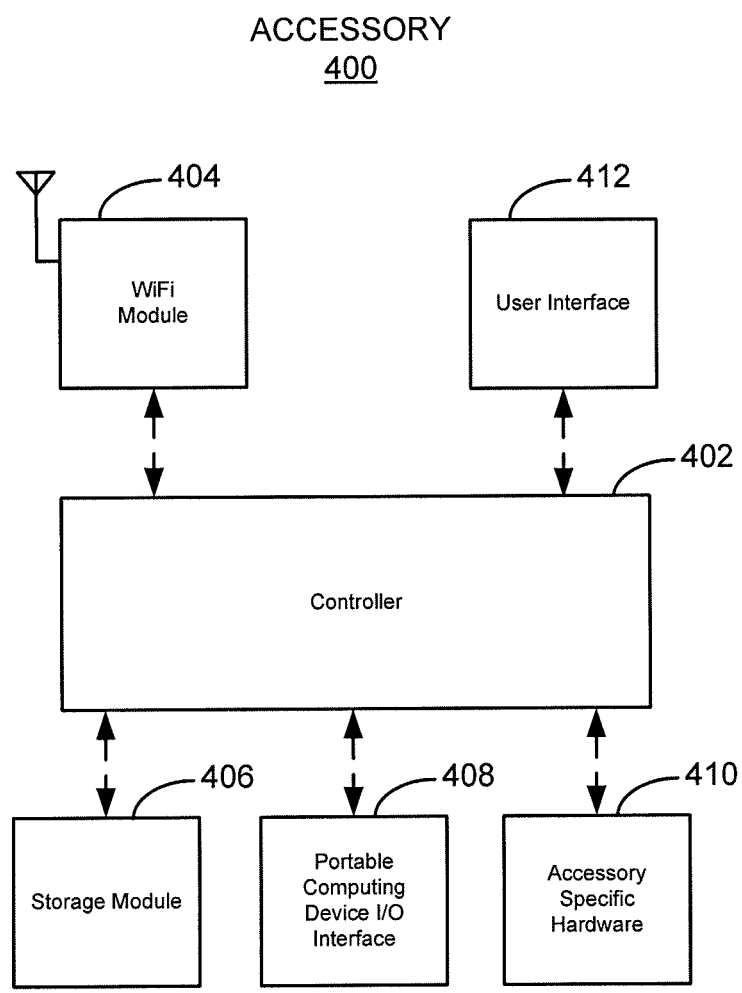
FIG. 4 illustrates an exemplary accessory according to an embodiment of the present invention.

FIG. 4 is a block diagram showing an exemplary accessory 400 (e.g., accessory 104) according to an embodiment. In one example, portable computing device 400 can include a controller 402, a WiFi module 404, a storage module 406, a portable computing device I/O interface 408, and accessory specific hardware 410. In some embodiments, accessory 400 can include additional modules, such as Bluetooth modules, display modules, RF modules, and/or the like.

In certain embodiments, one or more components (e.g., controller 402, WiFi module 404, etc.) of accessory 400 can be enclosed within a device housing. The device housing can be implemented using any suitable materials, such as plastic, metal, acrylic, glass, wood, etc.

Controller 402, which can be implemented as one or more integrated circuits, can control and manage the overall operation of accessory 400. For example, controller 402 can perform various tasks, such as accessing the functionalities of various modules (e.g., interacting with other WiFi enabled devices via WiFi module 404), executing various software programs (e.g., operating systems and applications) residing on storage module 406, requesting, receiving, and using wireless network access credentials, and so on. In some embodiments, controller 402 can include one or more processors (e.g., microprocessors or microcontrollers) configured to execute machine-readable instructions. For example, controller 402 can include a single chip applications processor. Controller 402 can further be connected to storage module 406 in any suitable manner.

WiFi module 404 can include any suitable combinations of hardware for performing WiFi (e.g., IEEE 802.11 family standards) based communications with other WiFi enabled devices.

Storage module 406 can be implemented, e.g., using disk, flash memory, random access memory (RAM), hybrid types of memory, optical disc drives or any other storage medium that can store program code and/or data. Storage module 406 can store software programs that are executable by controller 402, including operating systems, applications, and related program code. In some embodiments, storage module 406 can include a suitable set of instructions, executable by controller 402, for requesting and receiving wireless network access credentials.

Portable computing device input/output (I/O) interface 408 can include a number of signal paths configured to carry various signals between accessory 400 and portable computing device 300. In one embodiment, mobile portable computing device I/O interface 408 can include a connector adapted to mate with a connector (e.g. a 30-pin connector) used on iPad™, iPod® and iPhone™ products manufactured and sold by Apple Inc. Other connectors can also be used; for example, portable computing device I/O interface 408 can include a standard USB or FireWire connector or the like.

User interface 412 can include input controls and indicators, such as a touch pad, touch screen, scroll wheel, click wheel, dial, button, keypad, microphone, probes, etc., as well as output devices, such as a video screen, indicator lights, speakers, headphone jacks or the like, together with supporting electronics (e.g., digital-to-analog or analog-to-digital converters, signal processors or the like). A user can operate the various input controls of user interface 412 to invoke the functionality of accessory 400 and can view and/or hear output from accessory 400 via user interface 412. For example, user interface 412 can include a button and an LED indicator. A user can press the button, which can cause accessory 400 to request a wireless network access credential from a connected portable computing device. Upon connecting to a wireless network, accessory 400 can illuminate the LED indicator. According to some embodiments, a user can operate a connected portable computing device (or applications executing thereon) via accessory user interface 412.

Accessory specific hardware 408 can represent any hardware needed to enable desired functionality of accessory 400. For example, accessory specific hardware 408 can include one or more data gathering devices, such as any type of sensor or meter. In some embodiment, accessory specific hardware 408 can include an electrical meter that generates data representing electrical characteristics (resistance, voltage difference, or the like); a light sensor that detects light and/or patterns of light; a motion sensor; a temperature sensor; a humidity sensor; a pressure sensor; a chemical sensor that responds to the presence of selected chemicals (e.g., potentially toxic gases such as carbon monoxide); and so on. Accessory specific hardware 408 can also include one or more medical device such as a glucose meter, respiratory meter, heart rate and/or heart function monitor, blood pressure monitor, or the like.

In some embodiments, accessory specific hardware 408 that includes a data-gathering device can provide one or more electrical signals (e.g., voltage, resistance, and/or current) that correspond to or represent the physical data. Analog and/or digital signals in a variety of formats can be used. Accessory specific hardware 408 can also include signal processing components that process the signal before sending it to controller 402; in some embodiments, accessory specific hardware 408 can send the electrical signal directly to controller 402, which can process the signal. Further, signals representing data gathered by accessory specific hardware 408 can be sent (with or without processing by controller 402) to an application executing on portable computing device 300, e.g., using an application protocol as described below; thus an application executing on portable computing device 300 can also process data gathered using accessory specific hardware 408.

In some embodiments, accessory specific hardware 408 can include one or more computer-controllable devices. Examples of computer-controllable devices include motors, actuators, lights, cameras, valves, speakers, display screens, printers, and/or any other equipment that is controllable by controller 402. In some embodiments, an application executing on portable computing device 300 can send control signals to accessory 400, and controller 402 can operate accessory specific hardware 408 in response to the control signals.

In some embodiments, accessory specific hardware 408 can include components of user interface 412. In some embodiments, accessory specific hardware 408 can include network and/or communication interfaces. In other embodiments, accessory specific hardware 408 can include a communication interface to a personal area network. In still other embodiments, accessory specific hardware 408 can include a telephone interface, GSM, CDMA, and/or other voice and/or data network interfaces. Accessory specific hardware 408 can encompass any hardware component for which interoperability with a mobile computing and/or communication device may be desirable.

It will be appreciated that the portable computing device and accessory shown in FIGS. 3 and 4 are illustrative and that variations and modifications are possible. For example, certain modules can be removed, added, altered, changed, combined, etc. Further, while the portable computing device and accessories shown in FIGS. 3 and 4 have been described with reference to particular blocks representing certain modules and a controller, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 5A:
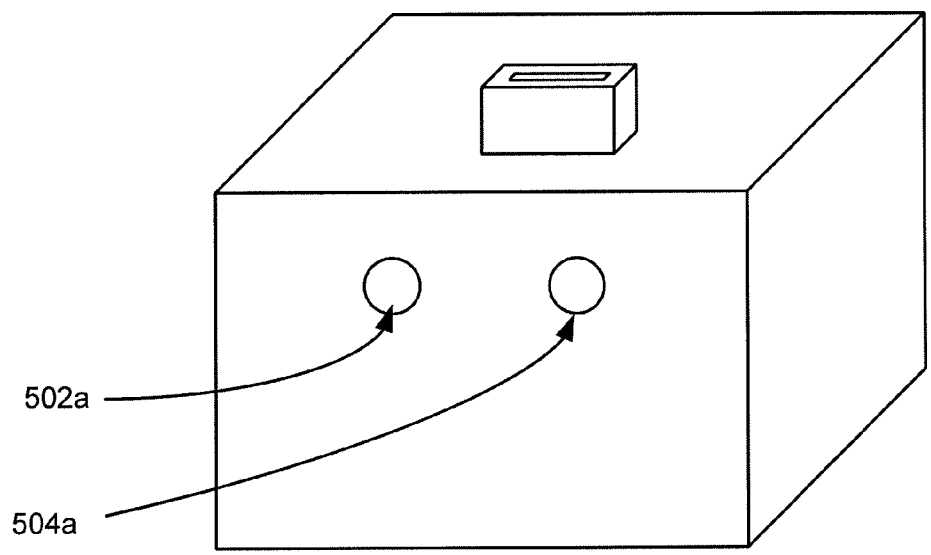
FIGS. 5a and 5b illustrate exemplary accessories including example user interfaces.
Figure 5B:
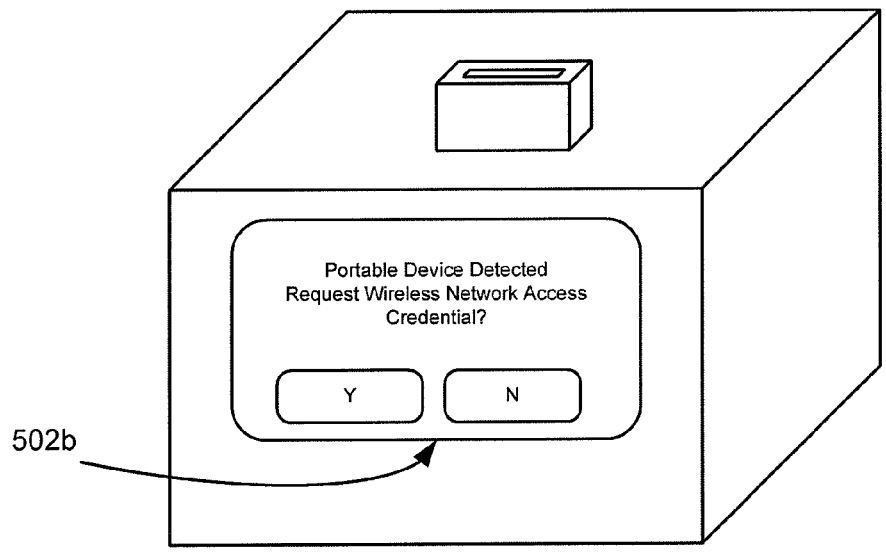

FIGS. 5a and 5b illustrate exemplary accessories including example user interfaces.

FIG. 5a shows an accessory 500a (e.g., a docking connector) that can include a button 502a and an indicator 504a.

Indicator 504*a* can be any suitable mechanism for providing an indication to a user. For example, indicator 504*a* can be a LED light, another bulb-based light source, etc. In some embodiments, button 502*a* can be pressed downward or depressed by a user. Such a user interaction can cause accessory 500*a* to perform certain functions. Illustratively, upon receiving an indication that a user has depressed button 502*a*, accessory 500*a* can transmit a message to a portable computing device connected to the accessory requesting a wireless network access credential. Accessory 500*a* can thereafter use the wireless network access credential to join or connect to a wireless network.

In certain embodiments, accessory 500*a* can control indicator 504*a* such that the current connection status of the accessory can be indicated to a user. For example, after successfully joining a wireless network, accessory 500*a* can illuminate indicator 504*a*. By illuminating indicator 504*a*, accessory 500*a* can indicate to a user that the accessory is connected to a wireless network. In some embodiments, accessory 500*a* might not illuminate indicator 504*a* when the accessory is not connected to a WiFi network. According to certain embodiments, accessory 500*a* can cause indicator 504*a* to periodically or continuously blink (e.g., successively turned on and off) when a WiFi network is detected but a connection has not be established.

FIG. 5*b* shows an accessory 500*b* (e.g., a docking connector) that can include a touch screen 502*b*. In some embodiments, a user can interact with touch screen 502*b* in order to cause accessory 500*b* to perform certain functions. Illustratively, as shown in FIG. 5*b*, touch screen 502*b* can display, to a user, prompt as to whether accessory 500*b* should request a wireless network access credential from a connected portable computing device. In some embodiments, touch screen 502*b* can display such a prompt in response to the detection or establishment of a connection with the portable computing device. After displaying the prompt, touch screen 502*b* can receive an input from a user indicating whether a wireless network access credential should be requested.

Examples of processes that can be used to enable an accessory to access a wireless network using a portable computing device will now be described.

Figure 6:
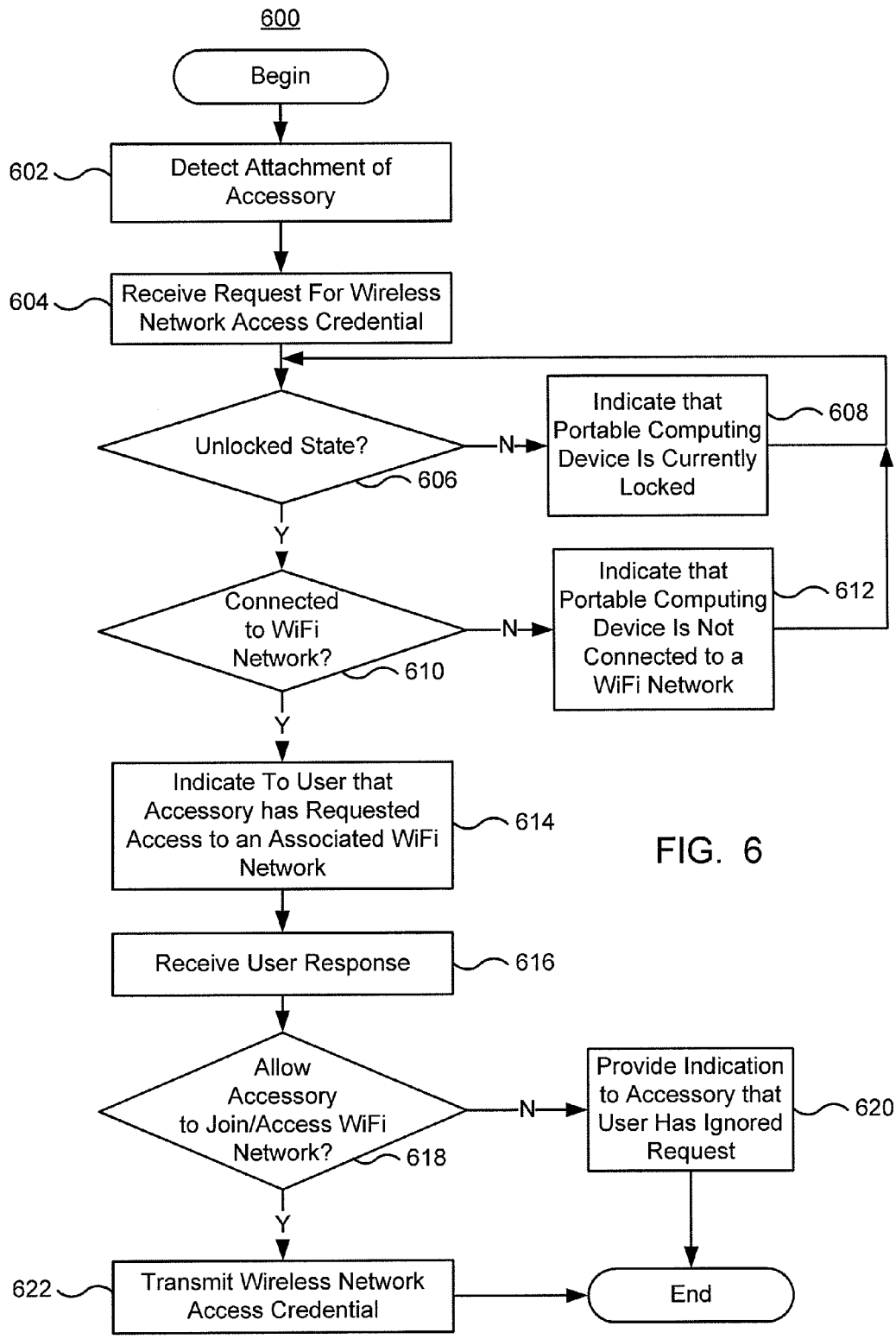
FIG. 6 is a flow diagram of a process usable by a portable computing device for transmitting a wireless network access credential to an accessory according to an embodiment of the present invention.

FIG. 6 is a flow diagram of a process 600 for transmitting a wireless network access credential to an accessory. Process 600 can be performed by e.g., portable computing device 102 of FIGS. 1 and 2. Process 600 can be used, in certain embodiments, by portable computing device 102 to communicate with accessory 104.

At block 602, portable computing device 102 can detect the attachment or connection of accessory 104. In certain embodiments, portable computing device 102 be connected to accessory 104 via a suitable cable. For example, the cable can include a 30-pin connector for interfacing with portable computing device 102. In other embodiments, portable computing device 102 can be connected via a docking mechanism. For example, accessory 104 can include a 30-pin connector situated within a recess. Portable computing device 102 can be positioned by the recess such that the portable computing device can mate with the 30-pin connector. In still other embodiments, portable computing device 102 can be connected to accessory 104 via a wireless connection. Illustratively, portable computing device 102 can be paired with and connected to accessory 104 over a Bluetooth connection.

In some embodiments, portable computing device 102 can authenticate accessory 104 following detection of the accessory. For example, portable computing device 102 can receive authentication information from accessory 104. Based on the authentication information, portable computing device 102 can determine whether operation between the device and accessory is authorized. If operation is not authorized, process 600 can terminate.

At block 604, portable computing device 102 can receive a request for a wireless network access credential from accessory 104. In some embodiments, the request can be received automatically after the establishment of the connection between portable computing device 102 and accessory 104. In other embodiments, the request can be received after a user interacts with (e.g., presses a button) accessory 104.

At decision 606, portable computing device 102 can determine whether the portable computing device is currently in an unlocked or active state. More specifically, in some embodiments, portable computing device 102 can be switched between an unlocked and locked state. While in an unlocked state, a user of portable computing device 102 can access the functionality of the portable computing device and cause the portable computing device to perform a number of operations. For example, a user can cause portable computing device to execute a web browsing program, place a voice phone call, transmit an SMS text message, and/or the like. In order to secure the portable computing device during periods of non-use, portable computing device can be switched into a locked state. Portable computing device can enter a locked state automatically (e.g., after a certain period of inactivity) or after receiving an indication from its user (e.g., a user can press a button to indicate that the portable computing device should enter a locked state). While in a locked state, portable computing device 102 can limit the number of operations accessible to a user. For example, while in a locked state, portable computing device 102 might only allow a user to place an emergency phone call or enter a passcode to unlock portable computing device 102.

Figure 7A:
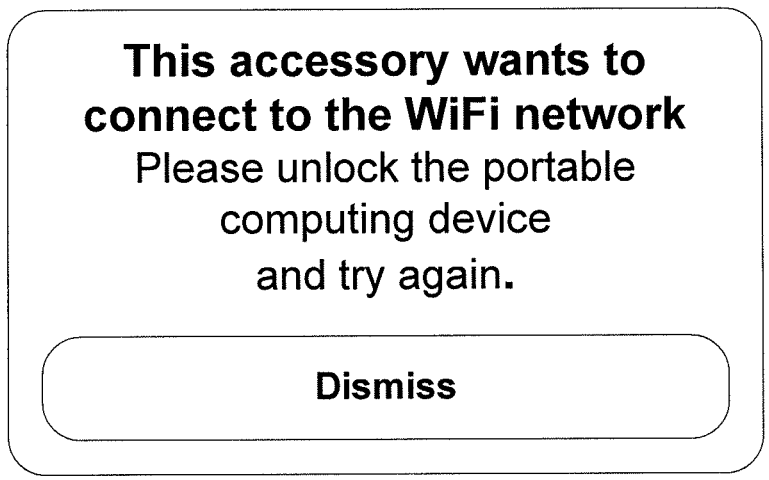
FIGS. 7a-7c illustrate exemplary messages provided by a portable computing device according to an embodiment of the present invention.

Referring again to decision 606 of FIG. 6, if portable computing device 102 determines that it is currently in a locked state, the portable computing device can provide an alert or message to a user at block 608. In some embodiments, the message can indicate that accessory 104 has requested WiFi network credentials while the portable computing device is currently locked. The message can be indicated in any suitable manner (e.g., via a touch screen, via a speaker, etc.). For example, the message can be displayed on a touch screen module of portable computing device 102. FIG. 7*a* illustrates an exemplary message that can be presented to a user using a touch screen module of portable computing device 102.

Figure 7B:
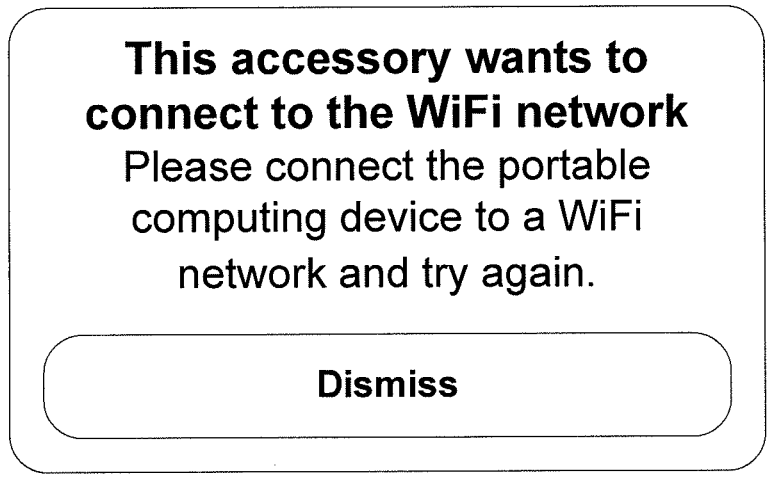

If, at decision 606, portable computing device 102 determines that it is currently in an unlocked state, the portable computing device can proceed to determine whether it is currently connected to a WiFi network at decision 610. For example, portable computing device 102 can determine whether the portable computing device is joined to a WiFi network and/or able to access other devices connected to the WiFi network (e.g., an access point, other networked devices, etc.). If portable computing device 102 determines that it is currently not connected to a network, the portable computing device can provide an alert or message to its user at block 612. In some embodiments, the message can indicate that accessory 104 has requested a WiFi network credential, but that the portable computing device is not currently connected to a WiFi network. FIG. 7*b* illustrates an exemplary message that can be presented to a user using a touch screen module of portable computing device 102.

If portable computing device 102 determines that it is currently connected to a WiFi network, portable computing device 102 can proceed to provide an alert or message to its user at block 614. In some embodiments, the message can indicate that an accessory has requested a credential for a WiFi network to which portable computing device 102 is currently connected. The message can further inquire whether portable computing device 102 is authorized to provide, to the accessory, the network access credential associated with the WiFi network with which the portable computing device is currently connected. The message can be indicated in any suitable manner. For example, the message can be presented on a touch screen module of portable computing device 102. As another example, the message can be conveyed through an audio alert.

Figure 7C:
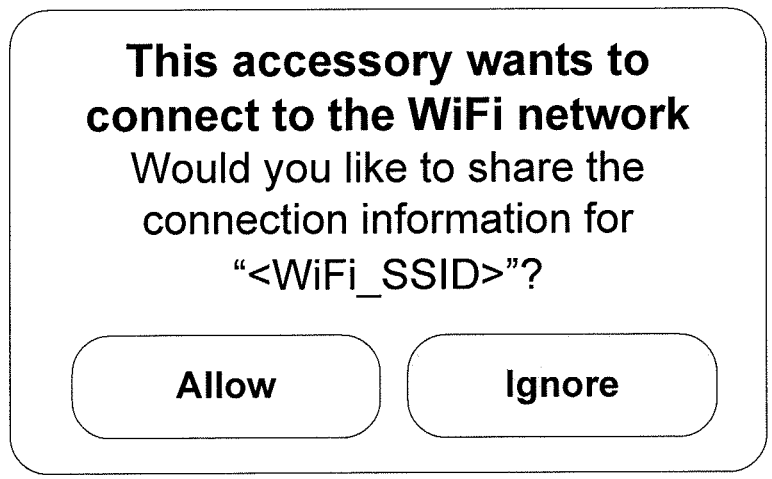

FIG. 7c illustrates an exemplary message that can be presented to a user using a touch screen module of portable computing device 102. As shown in FIG. 7c, the "Ignore" button can be the default selection. As a result, a positive user confirmation can be required before a wireless network access credential can be transmitted. In doing so, inadvertent transmission of a wireless network access credential can be avoided.

At block 616, portable computing device 102 can receive a response from the user. The response can be received from the user in any suitable manner. For example, a user can interact with (e.g., tap on the surface of) a touch screen module of portable computing device 102 in order to provide a response. As another example, a user can interact with a physical button or switch embedded in portable computer device 102 in order to provide the response. In still other embodiments, a user can provide an audio input via a microphone of portable computing device 102. For example, a user can provide an affirmative input by stating "Yes," "Okay," "Proceed," etc.

At decision 618, portable computing device 102 can determine whether the received user response indicates that accessory 104 should be permitted to access the WiFi network to which portable computing device 102 is currently connected.

If the received user response indicates that accessory 104 should not be permitted to access the WiFi network to which portable computing device 102 is connected, the portable computing device can transmit an indication to accessory 104 that it is not permitted to connect to the WiFi network at block 620. In some embodiments, the indication can indicate to accessory 104 that the user of portable computing device 102 has ignored the request.

In some embodiments, portable computing device 102 might not receive, from a user, a specific indication that accessory 104 not be permitted to access a WiFi network. Rather, after providing a message to the user indicating that accessory 104 has requested a WiFi credential, portable computing device 102 can wait a preset time period. If the portable computing device does not receive a user response prior to the expiration of the time period, portable computing device 102 can determine that accessory 104 is not permitted to connected to the WiFi network.

If the received user response indicates that accessory 104 should be permitted to access the WiFi network to which portable computing device 102 is connected, the portable computing device can transmit a wireless network access credential for the WiFi network at block 622. In some embodiments, the wireless network access credential can include an SSID for the wireless network and/or security information (e.g., a WEP password, a WPA password, etc.). Based on this information, accessory 104 can connect to the WiFi network associated with the wireless network access credential. For instance, accessory 104 can transmit the wireless network access credential to access point 106, which manages the WiFi network. Based on the wireless network access credential, access point 106 can establish a connection with accessory 104 and permit the accessory to access the WiFi network.

In certain embodiments, portable computing device 102 can store and transmit wireless network access credentials for more than one wireless network. Illustratively, in one instance, portable computing device 102 can transmit a wireless network access credential for a first wireless network to an accessory. In another instance, portable computing device 102 can transmit a different wireless network access credential for a second wireless network to the accessory.

In some embodiments, portable computing device 102 can only transmit the wireless network access credential associated with the network to which the portable computing device is currently connected. For example, portable computing device 102 can store the wireless network access credentials for ten different wireless networks. However, portable computing device 102 might be configured to transmit, to accessory 104, only the wireless network access credential for the network to which it is currently connected.

In some embodiments, portable computing device 102 can also configure access point 106 such that accessory 104 can access the WiFi network managed by the access point. For example, access to the WiFi network can be based on the media access control (MAC) address or some other unique identifier of each networked device. Illustratively, access point 106 might only permit devices associated with certain MAC addresses to join and access an associated WiFi network. Portable computing device 102 (which is already authorized to access the network) can transmit the MAC address associated with accessory 104 to access point 106. Portable computing device 102 can further indicate to access point 106 that a device associated with the transmitted MAC address should be permitted to access the network. In some embodiments, portable computing device 102 can obtain the MAC address associated with accessory 104 directly from the accessory. For example, portable computing device 102 can automatically receive accessory's 104 MAC address upon establishing a connection with the accessory, or portable computing device 102 can request the MAC address from accessory 104 at any time while the devices are connected.

In some embodiments, a stored wireless network access credential can be updated. Illustratively, a user can indicate to portable computing device 102 that a password for a particular wireless network has changed. In response, portable computing device 102 can update or change the stored password for the wireless network. A user can update or change the stored password in any suitable manner. For example, a user can interact with a graphical user interface provided by portable computing device via its touch screen display.

Figure 8:
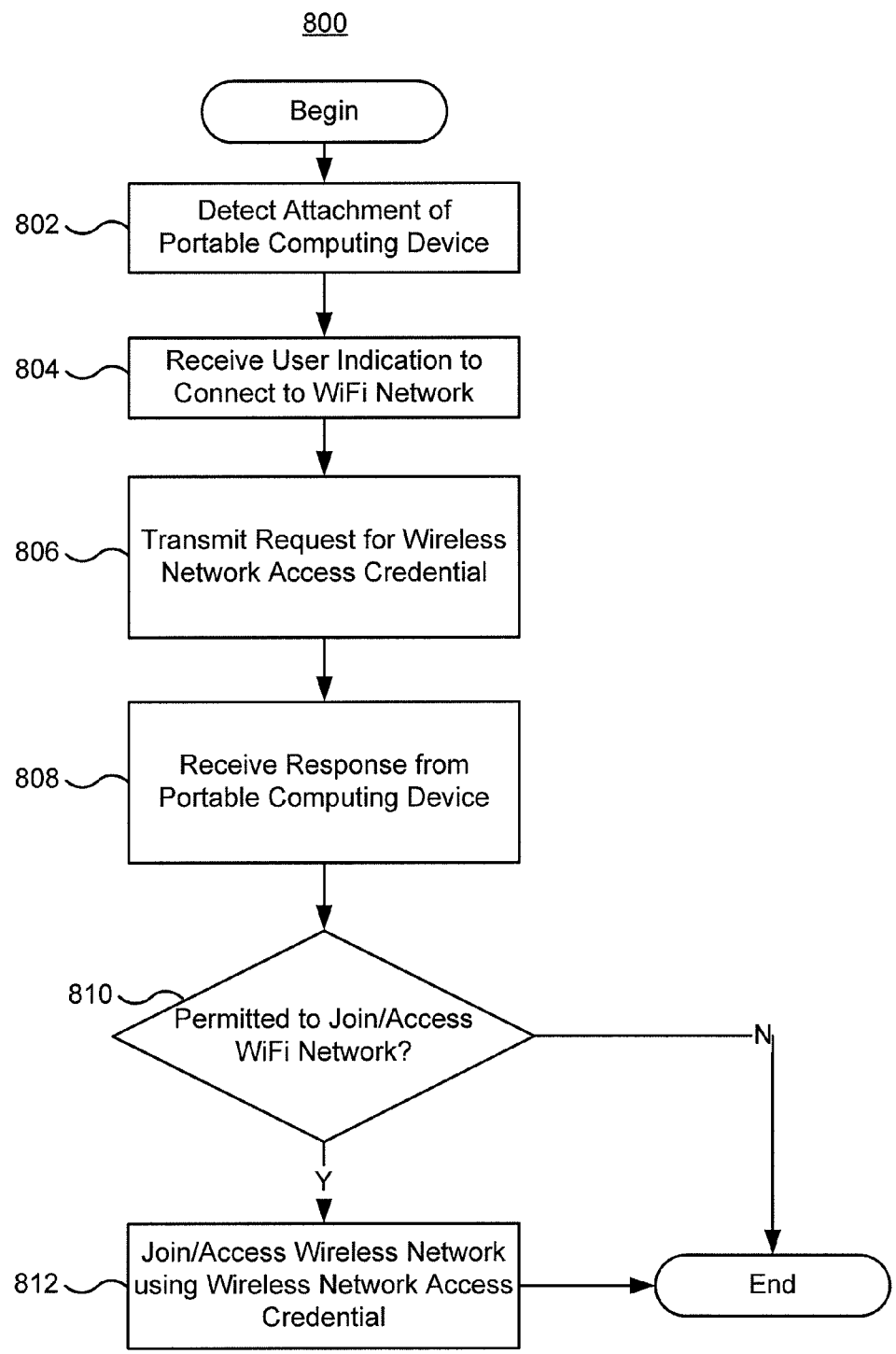
FIG. 8 is a flow diagram of a process usable by an accessory for receiving a wireless network access credential and connecting to a wireless network according to an embodiment of the present invention.

FIG. 8 is a flow diagram of a process 800 for requesting and receiving a wireless network access credential from a portable computing device. Process 800 can be performed by e.g., accessory 104 of FIGS. 1 and 2. Process 800 can be used, in certain embodiments, by accessory 104 to communicate with portable computing device 102.

At block 802, accessory 104 can detect the attachment or connection of portable computing device 102. In certain embodiments, accessory 104 can be connected to portable computing device 102 via a suitable cable (e.g., a cable including a 30-pin connector). In other embodiments, accessory 104 can include a docking mechanism for connecting to portable computing device 102. For example, accessory 104 can include a 30-pin connector situated within a recess. Portable computing device 102 can be positioned in or adjacent to the recess such that the portable computing device can mate with the 30-pin connector. In still other embodiments, accessory 104 can be connected to portable computing device 102 via a wireless connection (e.g., a Bluetooth connection).

In some embodiments, accessory 104 can be authenticated by portable computing device 102 following its attachment or connection to the portable computing device. For example, accessory 104 can transmit authentication information to portable computing device 102, which can be used by the portable computing device to verify that operation between the accessory and portable computing device is authorized. If authentication fails, process 800 can end.

At block 804, accessory 104 can receive a user indication to connect to a WiFi network. Illustratively, accessory 104 can include a user interface. The user interface can include, for example a button, a switch, a touch screen, an LED, etc. In some embodiments, a user can interact with the user interface to cause accessory 104 to transmit a request for a wireless network access credential to portable computing device 102. Illustratively, a user can push or press on a "Connect to WiFi" button on a housing of accessory 104.

At block 806, accessory 104 can transmit a request for a wireless network access credential to portable computing device 102. In some embodiments, the wireless network access credential can enable accessory 104 to access or join a WiFi network. In some embodiments, accessory 104 can additionally transmit a MAC address (or some other identifier) associated with the accessory to portable computing device 102. The MAC address can be assigned to accessory 104 during, for example, manufacturing. Portable computing device 102 can, in turn, provide the MAC address to access point 106, and configure the access point to permit any device associated with the MAC address to join and/or access a WiFi network managed by the access point.

At block 808, accessory 104 can receive a response from portable computing device 102. The response can indicate whether accessory 104 is permitted to connect to a WiFi network to which portable computing device 102 is currently connected. If permitted, the response can also include a credential. At decision 810, accessory 104 can determine whether the received response indicates that accessory 104 is authorized to connect to a WiFi network.

If accessory 104 determines that the received response indicates that the accessory is not authorized to access a WiFi network, accessory 104 can provide an alert (e.g., a sound alert, a blinking LED alert, etc.) to its user.

If accessory 104 determines that the received response indicates that the accessory is authorized to access a WiFi network, accessory 104 can join and/or access the WiFi network at block 812. More specifically, the received response can include a wireless network access credential for the WiFi network with which portable computing device 102 is currently connected. The received wireless network access credential can include any information needed by the accessory to join the network. For example, a wireless network access credential can include an SSID associated with the WiFi network. The network access credential can additionally include security information, such as a WEP password, a WPA password, etc. Accessory 104 can transmit the received wireless network access credential (and/or information derived from the credential) to access point 106, which manages the operations of the WiFi network. Based on the wireless network access credential, access point 106 can permit accessory 104 to access the WiFi network associated with the access point.

Once accessory 104 has joined a WiFi network, the accessory can access the network in any suitable manner. Illustratively, accessory 104 can access the network to communicate with various computing devices and/or other networks (e.g., the Internet). For example, accessory 104 can be a radio system configured to transmit a digital audio stream over the network to one or more other devices connected to the network. As another example, accessory 104 can be a printer configured to receive printing data from a computer connected to the WiFi network over the Internet. Accessory 104 can use the received printing data to format and generate a printed document. As still another example, accessory 104 can be a multimedia device configured to receive one or more video streams from a computer server connected to the WiFi network (e.g., over the Internet). The multimedia device can thereafter render the one or more video streams such that the video can be displayed on a television connected to the multimedia device.

FIG. 9 is a block diagram of an electronic device 900 which may implement embodiments described herein. As shown, the electronic device 900 may comprise preprocessor(s) 910, random access memory 920, disk drive 930 and communication interface(s) 960 coupled to shared bus 980. Communication interface(s) may also couple to bus 990.

It will be appreciated that processes 600 and 800 are illustrative and that variations and modifications are possible. Steps described as sequential may be executed in parallel, order of steps may be varied, and steps may be modified, combined, added or omitted. Processes 600 and 800 can be used with any accessory, including accessories that have limited user interfaces. A user can enable the transfer of credentials via a portable computing device without needing to enter the credentials directly into an accessory's user interface. As discussed, such interfaces can often be difficult to use. Furthermore, because embodiments enable accessories to be configured without requiring users to manually type in network access credentials, mistakes can be avoided e.g., typing in an incorrect password or access key.

Furthermore, while the embodiments described herein are primarily directed at transferring wireless network access credentials for WiFi based networks, credentials can be transferred for any wireless communication standard. Illustratively, in some embodiments, the discovery phase credentials for a pairing based communication protocol can be exchanged between an accessory and a device (e.g., an access point) via a portable computing device. In doing so, the accessory and device can use the exchanged information to proceed with an over the air key exchange/pairing process. For example, in some embodiments, a portable computing device can be configured to transmit a Bluetooth access credential (e.g., Bluetooth device addresses, device access codes, clock information, PINs, etc.) to a connected accessory. Based on the wireless network access credential, the accessory can connect to a device associated with the received credential. Illustratively, the portable computing device can be configured to transmit a Bluetooth access credential to an accessory. The access credential can include, for example, a Bluetooth device address and a PIN associated with the address. Thereafter, the accessory can come in range of a device associated with the Bluetooth device address. In response, the accessory can automatically initiate a pairing sequence with the device. During the pairing sequence, the accessory can additionally automatically provide the PIN included in the credential. In doing so, a user of the accessory does not need to enter in configuration information (e.g., a PIN) in order for the accessory and device to be connected.

While the embodiments described above may make reference to specific hardware and software components, those skilled in the art will appreciate that different combinations of hardware and/or software components may also be used and that particular operations described as being implemented in hardware might also be implemented in software or vice versa.

Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

What is claimed is:

1. A method of configuring an accessory for operation with a wireless network, the method comprising, by a portable computing device:
    detecting, by the portable computing device, connection of an accessory to the portable computing device;
    establishing communication with the accessory via the connection;
    receiving, from the accessory, a request for a credential usable to join a wireless network, wherein the portable computing device is currently connected to the wireless network;
    determining whether the portable computing device is in an unlocked state; and
    transmitting the credential to the accessory via the connection if the device is in the unlocked state;
    wherein the credential transmitted to the accessory is associated with the wireless network to which the portable computing device is connected; and
    wherein the credential includes a service set identifier (SSID) and security information associated with the wireless network.

2. The method of claim 1, wherein the accessory includes a docking mechanism; and
    wherein the connection of the accessory to the portable computing device is via the docking mechanism.

3. The method of claim 1, further comprising transmitting configuration information to an access point associated with the wireless network, wherein the configuration information instructs the access point to permit the accessory to access the wireless network.

4. The method of claim 3, wherein the configuration information includes a unique identifier associated with the accessory.

5. A method of configuring an electronic device for operation with a wireless network, the method comprising, by the electronic device:
    detecting, by the electronic device, connection of a portable computing device to the electronic device;
    establishing communication with the portable computing device via the connection;
    transmitting, to the portable computing device, a request for a credential usable to join a wireless network, wherein the portable computing device is currently connected to the wireless network;
    receiving the credential from the portable computing device via the connection if the portable computing device is in an unlocked state, wherein the credential transmitted to the electronic device is associated with the wireless network to which the portable computing device is connected, and wherein the credential includes a service set identifier (SSID) and security information associated with the wireless network; and
    joining a wireless network using the received credential.

6. The method of claim 5, further comprising receiving an instruction from a user to join to a wireless network, wherein the instruction from the user is received from a user interface dedicated to initiating the configuration of the electronic device for operation with a wireless network.

7. The method of claim 6, wherein the user interface includes at least one of a button, a switch, or a touch screen display.

8. The method of claim 5 further comprising indicating to a user whether the electronic device is currently connected to a wireless network.

9. The method of claim 8, wherein the indicating includes presenting a status message to a user using a display.

10. The method of claim 8, wherein the indicating includes operating an LED based light source.

11. The method of claim 8, wherein the indicating includes generating a sound.

12. The method of claim 5, further comprising transmitting, to the portable computing device, an accessory identifier associated with the electronic device.

13. The method of claim 12, wherein the accessory identifier is a Media Access Control (MAC) address.

14. A portable computing device comprising:
    a wireless interface configured to connect to a wireless access point;
    a device interface configured to connect to an electronic device; and
    a processor coupled to the wireless interface and the device interface, the processor being configured to:
        receive a request, from the electronic device for access information associated with the access point;
        determine whether one or more conditions for transferring the access information are met, wherein the one or more conditions include the portable computing device being in an unlocked state; and
        in the event the one or more conditions are met:
            receive identification information from the electronic device via the device interface;
            transmit the identification information to the access point; and
            transmit the access information to the electronic device via the device interface, wherein the access information enables the electronic device to join a wireless network associated with the access point, wherein the access information includes a service set identifier (SSID) and security information associated with the wireless network.

15. The portable computing device of claim 14 wherein the one or more conditions include:
    the portable computing device receiving a user input indicating that the electronic device be enabled to access a wireless network associated with the access point.

16. The portable computing device of claim 14 wherein an alert is provided to a user if at least one of the one or more conditions is not met.

17. An electronic device comprising:
a wireless interface;
a computing device interface configured to connect to a portable computing device; and
a processor coupled to the wireless interface and the computing device interface, the processor configured to:
transmit identification information to the portable computing device;
receive access information from the portable computing device via the computing device interface if the portable computing device is in an unlocked state;
identify a wireless access point based on the access information received from the portable computing device; and
transmit at least a portion of the access information to the wireless access point, wherein access to a wireless network associated with the wireless access point by the electronic device is based at least in part on the transmitted access information, wherein the access information includes a service set identifier (SSID) and security information associated with the wireless network.

18. The accessory of 17 wherein the identification information is received by the wireless access point from the portable computing device; and wherein access to the wireless network associated with the wireless access point is based at least in part on the identification information.

19. A non-transitory computer-readable medium having stored instructions thereon that, when executed by a processor of a portable computing device, cause the processor to perform operations comprising:
establishing a connection with an electronic device;
receiving a message from the electronic device requesting access to a wireless network;
determining that the portable computing device is not currently in a locked state;
determining that the portable computing device is currently connected to a wireless network; and
transmitting a credential for the wireless network to the electronic device, wherein the electronic device joins the wireless network based on the credential, wherein the credential includes a service set identifier (SSID) and security information associated with the wireless network, wherein said transmitting the credential is performed based at least in part on said determining that the portable computing device is not currently in a locked state, and said determining that the portable computing device is currently connected to a wireless network.

20. The non-transitory computer-readable medium of claim 19 wherein the connection between the portable computing device and the electronic device is a short-range wireless protocol connection.

* * * * *